United States Patent [19]
Durand et al.

[11] Patent Number: 5,911,412
[45] Date of Patent: Jun. 15, 1999

[54] HYDRAULIC ANTIVIBRATION SUPPORT

[75] Inventors: Sylvain Durand, Villorceau; Jean-Luc Gastineau, Montigny-Le-Gannelon, both of France

[73] Assignee: Hutchinson, Paris, France

[21] Appl. No.: 08/964,197

[22] Filed: Nov. 4, 1997

[30] Foreign Application Priority Data

Nov. 4, 1996 [FR] France ................................. 96 13393

[51] Int. Cl.⁶ ..................................................... F16F 13/00
[52] U.S. Cl. .............................. 267/140.13; 267/140.14; 267/219
[58] Field of Search ......................... 267/140.13, 140.14, 267/219, 35, 140.11; 248/562, 636; 180/300, 312

[56] References Cited

U.S. PATENT DOCUMENTS

| | | | |
|---|---|---|---|
| 4,621,795 | 11/1986 | Eberhard et al. . | |
| 4,793,600 | 12/1988 | Kojima | 267/140.1 |
| 4,836,515 | 6/1989 | Franz et al. | 267/219 |
| 4,889,326 | 12/1989 | Bouhours | 267/140.1 |
| 5,246,213 | 9/1993 | Zup et al. | 267/140.14 |
| 5,344,127 | 9/1994 | Hettler et al. | 267/140.13 |
| 5,667,205 | 9/1997 | Mutoh et al. | 267/140.13 |

FOREIGN PATENT DOCUMENTS

| | | |
|---|---|---|
| 0 248 942 | 12/1987 | European Pat. Off. . |
| 0 547 287 A1 | 6/1993 | European Pat. Off. . |
| 34 36 534 A1 | 4/1986 | Germany . |
| 39 33 248 A1 | 4/1991 | Germany . |
| 59-110931 | 6/1984 | Japan . |

OTHER PUBLICATIONS

French Search Report dated Aug. 6, 1997, French Application FR 9613393.

Gennesseaux "Research for New Vibration Isolation Techniques: From Hydro–Mounts to Active Mounts," Reprinted from Proceedings of the 1993 Noise and Vibration Conference: Noise and Vibration Conference & Expo., Traverse City, MI (May 10–13, 1993). pp. 491–499.

*Primary Examiner*—Peter M. Poon
*Attorney, Agent, or Firm*—Marshall, O'Toole, Gerstein, Murray & Borun

[57] ABSTRACT

The hydraulic antivibration support has two rigid strength members interconnected by a bell-shaped elastomer body, a flexible elastomer wall connected to the second strength member, and a rigid partition secured to the second strength member and defining both a working chamber on its elastomer body side and a compensation chamber on its flexible wall side. These two chambers are filled with liquid and are connected to each other via a narrow channel, via a central nozzle fitted with an axially movable shutter, and via an annular flap disposed around the central nozzle between two grids. One of the grids is axially slidable and is connected to the shutter so as to block the flap when the shutter is open.

9 Claims, 1 Drawing Sheet

HYDRAULIC ANTIVIBRATION SUPPORT

FIELD OF THE INVENTION

The present invention relates to hydraulic antivibration supports, intended in particular for supporting the engines of motor vehicles.

More particularly, the invention relates to a hydraulic antivibration support designed to be interposed between two rigid elements in order to damp and attenuate vibratory motion between said two elements along a central axis and to support an axial load exerted by one of said two elements, the support comprising:

- first and second rigid strength members designed to be secured to respective ones of the two rigid elements to be united;
- an elastomer body connecting the two strength members together, said elastomer body supporting the axial load and having a bell-shaped side wall which extends axially, flaring downwards from a top secured to the first strength member to an annular base secured to the second strength member;
- a flexible and easily deformable wall of elastomer having a peripheral edge connected in sealed manner to the second strength member, and co-operating therewith and with the elastomer body to define a sealed housing filled with liquid;
- a rigid partition which is secured to the second strength member and which extends perpendicularly to the central axis, thereby subdividing said sealed housing into two liquid-filled chambers, namely a working chamber defined in part by the elastomer body, and a compensation chamber defined in part by the flexible elastomer wall;
- a narrow passage interconnecting the working and compensation chambers, said channel having a certain length L and a certain equivalent diameter D such that the ratio L/D is greater than 10;
- a central nozzle formed through the rigid partition to put the working and compensation chambers into communication with each other, said central nozzle having an axial length l and an equivalent diameter d such that the ratio l/d is less than 10;
- a shutter secured to a central portion of the flexible elastomer wall and displaceable axially between a closed position in which it closes the nozzle and an open position in which it opens said nozzle;
- a control device for selectively placing the shutter either in its open position or in its closed position, said control device including an actuator member which is secured to the shutter member; and
- at least one passage formed through the rigid partition between the working and compensation chambers, at a position that is situated radially outside the nozzle, said passage being closed by a flap which extends perpendicularly to the central axis and which has two opposite faces respectively in communication with the working chamber and with the compensation chamber, said flap having at least a portion that is displaceable parallel to the central axis between first and second abutments with clearance of less than 1 mm, the first abutment being secured to the rigid partition.

BACKGROUND OF THE INVENTION

Such a hydraulic antivibration support is disclosed, for example, in document EP-A-0 547 287.

The antivibration support disclosed in that document nevertheless suffers from the drawback that the flap is always free to vibrate between its two abutments, even when the central nozzle is open.

Unfortunately, experience shows that that phenomenon spoils the operating efficiency of the central nozzle: in other words, when the central nozzle is opened essentially for the purpose of reducing the elastic stiffness of the antivibration support, in particular when the engine is idling, the fact that the flap remains free to vibrate in this situation prevents the elastic stiffness of the support from decreasing as much as it could if the flap were prevented from moving.

Also, document EP-A-0 297 974 describes a hydraulic antivibration support in which provision is made to lock the decoupling flap at the same time as a nozzle is opened between the working chamber and the compensation chamber.

That hydraulic antivibration support operates in entirely satisfactory manner, but suffers from the drawback of using relatively complex control means.

Also, the control means in question are mounted on the side of the hydraulic antivibration support, thereby increasing the size of the support and making it considerably more complicated to assembly and to fill.

OBJECTS AND SUMMARY OF THE INVENTION

An object of the present invention is to mitigate the various above-mentioned drawbacks.

To this end, according to the invention, in a hydraulic antivibration support of the kind in question, the second abutment for the flap is itself mounted with axial clearance of less than 1 mm between the flap and a counter-abutment secured to the rigid partition, said second abutment being mechanically linked with the shutter, the second abutment being pressed against the flap by the shutter when it is in its open position, then preventing substantially all axial movement of the flap, and said second abutment being pressed against the counter-abutment by the shutter when it is in its closed position.

In preferred embodiments, use may optionally be made of one or more of the following dispositions:

- the first abutment is in contact with the face of the flap that is in communication with the compensation chamber, while the second abutment is in contact with the face of the flap that is in communication with the working chamber, the outside of the nozzle being defined by a tube which extends along the central axis from a first end secured to the second abutment towards the flexible elastomer wall to a second end having at least an outwardly-directed flange, the shutter being pressed axially against said second end towards the elastomer body when said shutter is in its closed position, thereby axially pressing the second abutment against the counter-abutment, and the shutter being secured to a set of catches surrounding the tube and sliding axially along the tube, said catches being designed to engage with the flange at the second end of the tube, thereby pulling said tube and the second abutment towards the flexible elastomer wall when the shutter is in its open position, such that the second abutment is then pressed against the flap;
- the catches are constituted by resilient metal tabs which are cut out from a piece of sheet metal fixed to the shutter and which are snapped against the tube defining the nozzle;

the piece of sheet metal from which the resilient tabs are cut out has a central portion which is interposed between the shutter and the flexible elastomer wall, each resilient tab extending at an angle axially towards the rigid partition and radially inwards from said central portion to a free end which has an axial lip bearing resiliently against the tube and directed towards the outwardly-directed flange of said tube;

there are two catches which are disposed on opposite sides of the tube which defines the nozzle;

the control device consists in a suction capsule disposed in the vicinity of the flexile elastomer wall outside the sealed housing, said suction capsule having a hollow inside volume in communication, via an electrically controlled valve, either with the atmosphere or else with a suction source, said hollow inside volume being defined in part by a moving wall which constitutes the member for actuating the shutter and which is axially displaceable towards the inside of the suction capsule, entraining the shutter to its open position and pressing the second abutment against the flap when the suction capsule is in communication with the suction source, and the inside volume of the suction capsule also including a spring urging the moving wall towards the liquid-filled sealed housing, thereby placing the shutter in its closed position and pressing the second abutment against the corresponding counter-abutment when the suction capsule is in communication with the atmosphere;

the suction capsule has a fixed rigid wall which is secured to the second strength member, the moving wall of said capsule having a rigid central portion which is connected in sealed manner to the fixed wall via an annular bellows of elastomer;

the flap is annular in shape, surrounding the central nozzle, the first and second abutments for the flap being constituted by annular grids; and the shutter is constituted by a rigid washer having elastomer overmolded thereon, the central portion of the flexible elastomer wall itself having a rigid washer with elastomer overmolded thereon, these two washers and the actuator member of the shutter being connected together by means of a rivet which passes through them axially.

BRIEF DESCRIPTION OF THE DRAWINGS

Other characteristics and advantages of the invention appear from the following detailed description of an embodiment, given by way of non-limiting example and with reference to the accompanying drawing.

In the drawing.

MORE DETAILED DESCRIPTION

Figure 1:
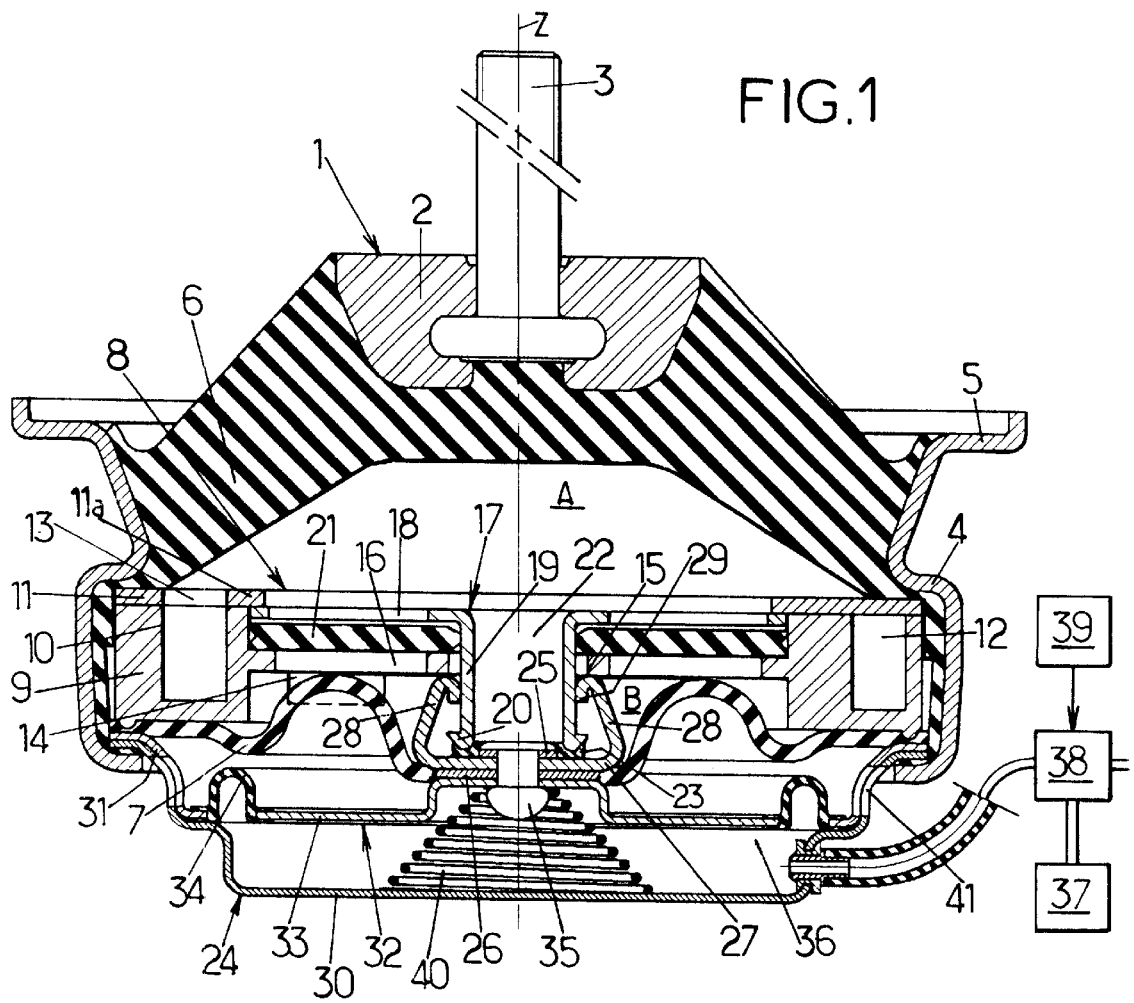
FIG. 1 is a vertical section view of a hydraulic antivibration support constituting an embodiment of the invention, and shown with its central nozzle closed.

In the description below, terms such as "up", "down", "top", "bottom", etc. are used solely to clarify the description, and they are not limiting in any way.

The hydraulic antivibration support considered herein is designed to be interposed vertically between a vehicle power unit and the structure of the vehicle, in order to support the weight of the power unit and to damp and attenuate vibratory motion between those two elements along a vertical axis Z.

The antivibration support comprises:

a first rigid metal strength member 1 which may be fixed to the power unit, for example, said first strength member being constituted by a central head 2 that is extended upwards by a pin 3 for fixing to an element that is secured to the power unit;

a second rigid metal strength member 4 in the form of a ring centered on the axis Z, said second strength member forming a tray 5 locally presenting fixing tabs (not shown) pierced with holes for fixing the second strength member to the structure of the vehicle;

an elastomer body 6 interconnecting the two strength members 1 and 4, said elastomer body being strong enough to support the axial load imposed on the support by the power unit, and said elastomer body having a bell-shaped side wall that may be circularly symmetrical about the axis Z and that flares downwards from a top secured to the first strength member down to an annular base secured to the second strength member;

an easily deformable flexible wall 7 made of elastomer, having a peripheral edge connected in sealed manner to the second strength member 4 and co-operating therewith and with the elastomer body to define a sealed housing full of liquid; and a rigid partition 8 secured to the second strength member 4 by said second strength member being crimped thereover, the partition extending perpendicularly to the axis Z and separating the sealed housing into two chambers filled with liquid, namely a working chamber "A" partially defined by the elastomer body 6, and a compensation chamber "B" partially defined by the flexible elastomer wall 7.

The partition 8 includes a bottom metal plate 9 having a thickened outside edge in which there is formed an upwardly-open groove 10. The groove is covered by a metal washer 11, with the plate 9 and the washer 11 being axially clamped together to form a stack by the crimping of the second strength member 4.

The groove 10 co-operates with the washer 11 to define a narrow channel 12 which extends angularly between two ends that are separated from each other by a solid piece of the thickened edge of the plate 9.

The narrow channel opens out firstly in an axial direction to the working chamber "A" via an orifice 13 through the washer 11, and secondly it opens out radially inwards into the compensation chamber "B" via an orifice 14 formed through the bottom plate 9.

The narrow channel 12 has a certain length L and a certain equivalent diameter D (where $D=2[S/\pi]^{1/2}$, where S is the mean right section of the channel 12) such that the ratio L/D is greater than 10, and generally lies in the range 10 to 100.

The narrow channel 12 makes it possible to provide sufficient damping of relative vibratory motion at relatively low frequency (e.g. less than 20 Hz) and of relatively large amplitude (e.g. greater than 1 mm) between the power unit and the vehicle structure, such vibratory motion being due, in particular, to the vehicle running over the ground.

Also, the bottom plate 9 has a central orifice 15, and the plate also forms between its thickened edge and the orifice 15 a flap horizontal annular grid 16.

The partition 8 also includes an annular metal part 17 that is generally circularly cylindrical about the axis Z and that includes a flat horizontal grid 18 whose radially inner edge is extended axially downwards by a tube 19. The tube 19 extends to a bottom end fitted with an outwardly projecting flange 20 which forms a shoulder facing upwards.

The tube 19 is engaged with clearance in the central orifice 15 of the plate 9, said central orifice being large enough to pass the flange 20.

Also, the grid 18 is disposed above the grid 16 and it is held in the vicinity of said grid 16 via the inside edge 11a of the washer 11 which overlies the periphery of said grid 18.

In addition, a flap 21 is housed between the two grids 16 and 18, which flap is in the form of a thin flat elastomer washer whose outside and inside edges are in sealed radial contact respectively with the thick outside edge of the plate 9 and with the tube 19.

Optionally, in order to make such sealed contact easier to achieve, the inside and outside edges of the flap 21 may be formed with thin sealing lips, for example, with the inside edge of the flap presenting a chamfered profile forming a single sealing lip while the outside edge of the flap presents an annular radial groove which defines two sealing lips.

When the grid 18 is in abutment against the metal washer 11, the flap 21 is free to move axially between the grids 16 and 18 with a small amount of axial clearance, generally less than 1 mm, and for example of the order of 0.5 mm.

In this configuration, the flap 21 serves to absorb vibratory motion of the power unit at relatively high frequency (e.g. greater than 50 Hz) and of relatively small amplitude (e.g. less than 1 mm).

Also, the inside of the tube 19 defines a nozzle 22 putting the working chamber A directly into communication with the compensation chamber B, which nozzle is of length l and a diameter d (or an equivalent diameter d using the same definition as that given above for the diameter D), such that the ratio l/d is less than 10, e.g. lying in the range 0.5 to 10.

The nozzle 22 can be selectively closed or opened by means of a shutter 23 e.g. under the control of a suction capsule 24 situated beneath the flexible wall 7.

By way of example, the shutter 23 is in the form of an elastomer washer overmolded on a metal washer 25, which metal washer is secured to another metal washer 26 also overmolded with elastomer, and constituting the central portion of the flexible wall 7.

Between the two washers 25 and 26, there is interposed a central portion of a piece 27 cut out from sheet metal and extending radially outwards in the form of two diametrically opposite resilient tabs 28 which are folded upwards and inwards towards the tube 19, each of the tabs 28 being terminated by a downwardly-folded lip 29 that slides against the outside surface of the tube 19.

Optionally there may be three tabs 28.

In addition, the suction capsule 24 includes:

a rigid sheet metal wall 30 in the form of a cup;

a rigid metal ring 31 stacked on the periphery of the wall 30 and secured to said wall and also to the second strength member 4, the assembly constituted by the periphery of the flexible wall 7, the periphery of the ring 31, and the periphery of the wall 30 being axially clamped against the bottom of the metal plate 9 by the crimping of the second strength member 4; and a moving wall 32 which includes a central horizontal rigid metal plate 33 connected to the ring 31 via an annular bellows 34 of elastomer overmolded on the inside and outside edges respectively of the ring 31 and the plate 33.

The plate 33 is secured to the central portion of the flexible wall 7 of elastomer by means of a rivet 35 that passes through and secures the stack constituted by the washer 25, the central portion of the sheet metal piece 27, the washer 26, and the plate 33.

Between the walls 30 and 32, the suction capsule 24 has an inside volume 36 which communicates either with the atmosphere, or else with a suction source 37 (air admission circuit of the engine, or optionally a vacuum pump), via an electrically controlled valve 38 having three ports and itself under the control of a computer 39 or other control system.

In addition, a compression spring 40 is disposed between the wall 30 and the plate 33 in such a manner as to urge the plate 33 upwards.

It will also be observed that the wall 30 and the ring 31 are pierced by at least one orifice 41 above the moving wall 32 to cause the intermediate space between the wall 32 and the flexible wall 7 to communicate with the atmosphere in such a manner that these two walls can be deformed freely without generating an increase or a decrease of pressure in said intermediate space.

During normal operation of the vehicle, the electrically controlled valve 38 causes the inside volume 36 of the suction capsule to communicate with the atmosphere, thereby causing the shutter 23 to be pressed axially against the bottom end of the tube 19, thereby closing the nozzle 22.

Consequently, the grid 18 which is secured to the tube 19 is also pressed in abutment against the inside edge of the washer 11, and as a result the flap 21 is free to move vertically between the two grids 16 and 18.

In contrast, in certain modes of vehicle operation, and in particular when the engine is idling, it is desirable to lock the flap 21 in position and to open the nozzle 22.

To this end, the computer 39 controls the valve 38 to cause the inside volume 36 of the depression capsule to communicate with the suction source 37.

Figure 2:
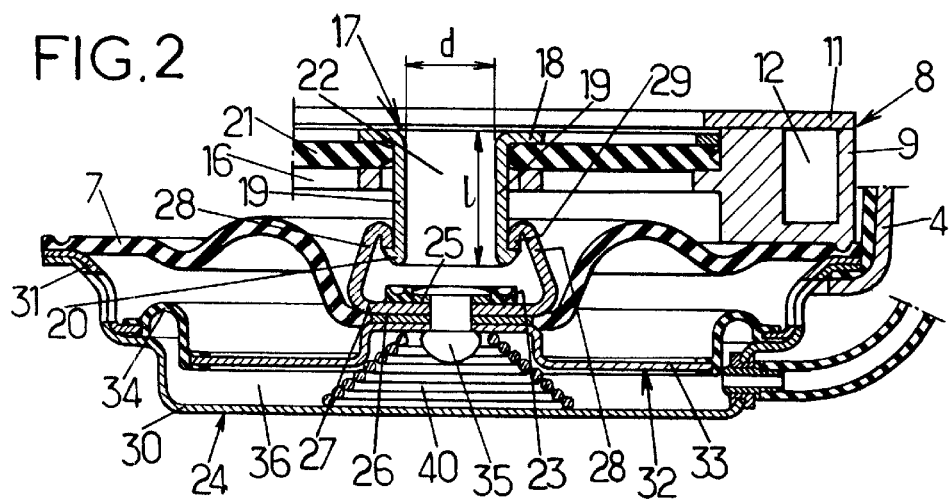
FIG. 2 is a fragmentary view of the FIG. 1 support shown with its central nozzle open.

Under such circumstances, and as shown in FIG. 2, the moving wall 32 of the suction capsule is displaced downwards against the resilient force of the spring 40, thereby opening the nozzle 22.

In addition, the lips 29 of the tabs 28 then come into abutment against the outwardly directed flange 20 of the tube 19, thus pulling the grid 18 downwards which in turn comes into abutment against the flap 21, thereby preventing it from moving.

In this position, the antivibration support is caused to have very low elastic stiffness, and thus becomes an excellent absorber of the vibrations produced by the engine at frequencies in the vicinity of 30 Hz, for example.

We claim:

1. A hydraulic antivibration support designed to be interposed between two rigid elements to damp and attenuate vibratory motion between said two elements along a central axis and to support an axial load exerted by one of said two elements, the support comprising:

first and second rigid strength members designed to be secured to respective ones of the two rigid elements to be united;

an elastomer body connecting the two strength members together, said elastomer body supporting the axial load and having a bell-shaped side wall which extends axially, flaring downwards from a top secured to the first strength member to an annular base secured to the second strength member;

a flexible and easily deformable wall of elastomer having a peripheral edge connected in sealed manner to the second strength member, and co-operating therewith and with the elastomer body to define a sealed housing filled with liquid;

a rigid partition which is secured to the second strength member and which extends perpendicularly to the central axis, thereby subdividing said sealed housing into two liquid-filled chambers, namely a working chamber defined in part by the elastomer body, and a compensation chamber defined in part by the flexible elastomer wall;

a narrow passage interconnecting the working and compensation chambers, said channel having a certain length L and a certain equivalent diameter D such that the ratio L/D is greater than 10;

a central nozzle formed through the rigid partition to put the working and compensation chambers into communication with each other, said central nozzle having an axial length l and an equivalent diameter d such that the ratio l/d is less than 10;

a shutter secured to a central portion of the flexible elastomer wall and displaceable axially between a closed position in which it closes the nozzle and an open position in which it opens said nozzle;

a control device for selectively placing the shutter either in its open position or in its closed position, said control device including an actuator member which is secured to the shutter; and at least one passage formed through the rigid partition between the working and compensation chambers, at a position that is situated radially outside the nozzle, said passage being closed by a flap which extends perpendicularly to the central axis and which has two opposite faces respectively in communication with the working chamber and with the compensation chamber, said flap having at least a portion that is displaceable parallel to the central axis between first and second abutments with clearance of less than 1 mm, the first abutment being secured to the rigid partition;

wherein the second abutment for the flap is itself mounted with axial clearance of less than 1 mm between the flap and a counter-abutment secured to the rigid partition, said second abutment being mechanically linked with the shutter, the second abutment being pressed against the flap by the shutter when it is in its open position, then preventing substantially all axial movement of the flap, and said second abutment being pressed against the counter-abutment by the shutter when it is in its closed position.

2. A hydraulic antivibration support according to claim 1, in which the first abutment is in contact with the face of the flap that is in communication with the compensation chamber, while the second abutment is in contact with the face of the flap that is in communication with the working chamber, the outside of the nozzle being defined by a tube which extends along the central axis from a first end secured to the second abutment towards the flexible elastomer wall to a second end having at least an outwardly-directed flange, the shutter being pressed axially against said second end towards the elastomer body when said shutter is in its closed position, thereby axially pressing the second abutment against the counter-abutment, and the shutter being secured to a set of catches surrounding the tube and sliding axially along the tube, said catches being designed to engage with the flange at the second end of the tube, thereby pulling said tube and the second abutment towards the flexible elastomer wall when the shutter is in its open position, such that the second abutment is then pressed against the flap.

3. A hydraulic antivibration support according to claim 2, in which the catches are constituted by resilient metal tabs which are cut out from a piece of sheet metal fixed to the shutter and which are snapped against the tube defining the nozzle.

4. A hydraulic antivibration support according to claim 3, in which the piece of sheet metal from which the resilient tabs are cut out has a central portion which is interposed between the shutter and the flexible elastomer wall, each resilient tab extending at an angle axially towards the rigid partition and radially inwards from said central portion to a free end which has an axial lip bearing resiliently against the tube and directed towards the outwardly-directed flange of said tube.

5. A hydraulic antivibration support according to claim 2, in which there are two catches which are disposed on opposite sides of the tube which defines the nozzle.

6. A hydraulic antivibration support according to claim 1, in which the control device consists in a suction capsule disposed in the vicinity of the flexile elastomer wall outside the sealed housing, said suction capsule having a hollow inside volume in communication, via an electrically controlled valve, either with the atmosphere or else with a suction source, said hollow inside volume being defined in part by a moving wall which constitutes the member for actuating the shutter and which is axially displaceable towards the inside of the suction capsule, entraining the shutter to its open position and pressing the second abutment against the flap when the suction capsule is in communication with the suction source, and the inside volume of the suction capsule also including a spring urging the moving wall towards the liquid-filled sealed housing, thereby placing the shutter in its closed position and pressing the second abutment against the corresponding counter-abutment when the suction capsule is in communication with the atmosphere.

7. A hydraulic antivibration support according to claim 6, in which the suction capsule has a fixed rigid wall which is secured to the second strength member, the moving wall of said capsule having a rigid central portion which is connected in sealed manner to the fixed wall via an annular bellows of elastomer.

8. A hydraulic antivibration support according to claim 1, in which the flap is annular in shape, surrounding the central nozzle, the first and second abutments for the flap being constituted by annular grids.

9. A hydraulic antivibration support according to claim 1, in which the shutter is constituted by a rigid washer having elastomer overmolded thereon, the central portion of the flexible elastomer wall itself having a rigid washer with elastomer overmolded thereon, these two washers and the actuator member of the shutter being connected together by means of a rivet which passes through them axially.

* * * * *